United States Patent [19]

Suzuki

[11] 4,089,219
[45] May 16, 1978

[54] BI-DIRECTIONAL OUTPUT ELECTROMAGNETIC FLOWMETER

[75] Inventor: Kazuie Suzuki, Tokyo, Japan

[73] Assignee: Hokushin Electric Works, Ltd., Tokyo, Japan

[21] Appl. No.: 745,862

[22] Filed: Nov. 29, 1976

[30] Foreign Application Priority Data

Nov. 29, 1975 Japan .................................. 50-143222

[51] Int. Cl.² ............................................... G01F 1/60
[52] U.S. Cl. ............................................. 73/194 EM
[58] Field of Search ................... 73/194 EM; 307/127

[56] References Cited

U.S. PATENT DOCUMENTS

| | | | |
|---|---|---|---|
| 3,783,687 | 1/1974 | Mannherz et al. | 73/194 EM |
| 3,962,917 | 6/1976 | Terada | 73/204 |

*Primary Examiner*—Charles A. Ruehl
*Attorney, Agent, or Firm*—Michael Ebert

[57] ABSTRACT

A circuit arrangement for a bi-directional output electromagnetic flowmeter including a polarity-detecting circuit arranged to detect the polarity of an input derived from the flowmeter. Means are provided to invert the input polarity and switching means are provided to select the inverted or non-inverted signal in accordance with the output of the polarity-detecting circuit. Thus a constant polarity output signal is obtainable at all times, even though the flow direction in a flow tube changes from time to time.

3 Claims, 6 Drawing Figures

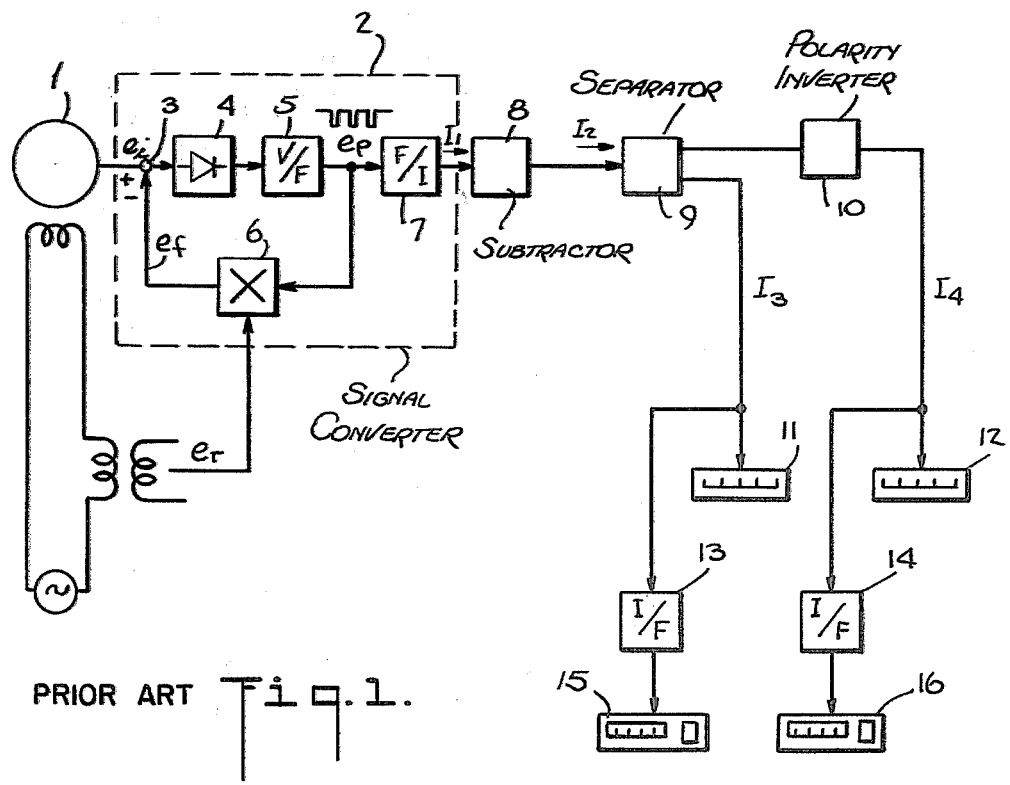
PRIOR ART Fig. 1.
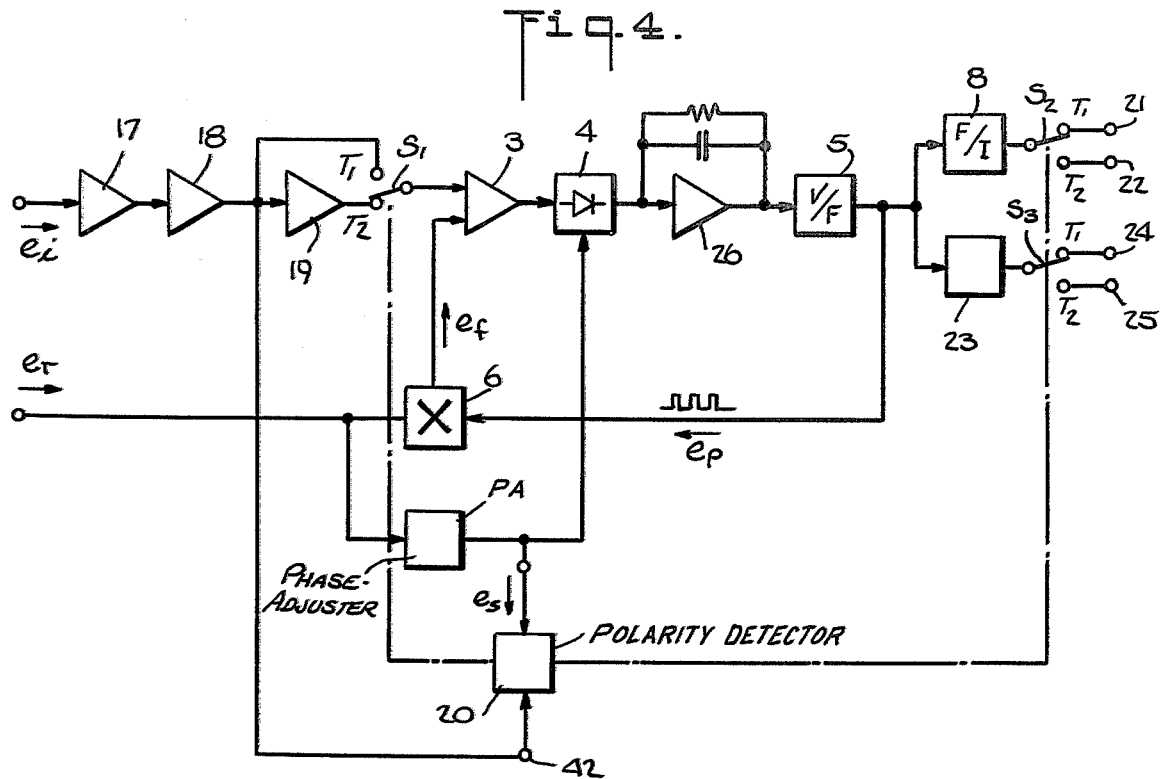
Fig. 4.

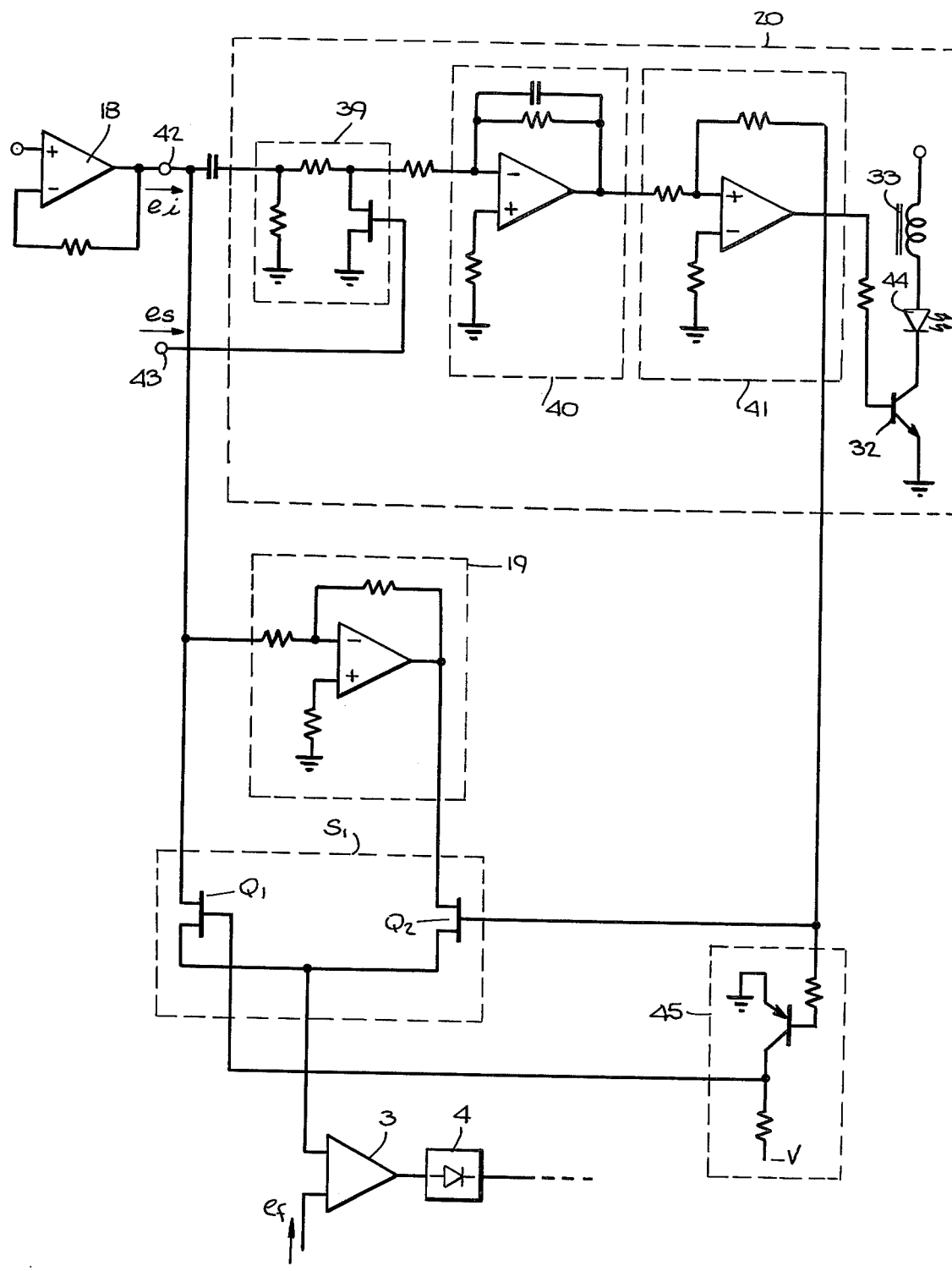

BI-DIRECTIONAL OUTPUT ELECTROMAGNETIC FLOWMETER

BACKGROUND OF THE INVENTION

This invention relates generally to magnetic flowmeters, and more particularly to a circuit for a bi-directional output type of magnetic flowmeter wherein the polarity of an input derived from a magnetic flowmeter is detected and inverted so that a constant polarity output signal can be produced at all times even though the flow direction in a flow tube alters.

In general, in a signal converter of a conventional magnetic flowmeter, a dividing circuit is provided. This circuit acts to obtain the ratio between a flow signal and a signal which is proportional to the excitation current of the flowmeter so as to eliminate measurement error caused by fluctuations in this current. The dividing circuit is usually composed of a multiplying circuit and a subtracting circuit. To simplify the construction thereof, the flow signal is first converted to a frequency signal by use of a voltage-to-frequency converter whose duty cycle is proportional to the flow signal. Then the output of the converter is applied to the multiplying circuit which is driven with the pulse signal.

The frequency of this pulse signal, which corresponds to a 0 to 100% volumetric flow rate and operates within a frequency band of, for example, 0 to 10 KHz, is varied with the output of a synchronous rectifier whose output changes in the negative (−) direction in accordance with a 0 to 100% input. As a result, when the flow direction is reversed and when the signal of the inverted polarity is applied to the synchronous rectifier, since the synchronous rectifier generates the inverted polarity output, the voltage-to-frequency converter does not respond to the output of the synchronous rectifier, and maintains a zero output. Thus the drawback of a conventional signal converter is that even though it may respond to an input derived from a fixed flow direction, it does not respond to the input derived from the other flow direction.

When the magnetic flowmeter is used, for example, for service water transactions, it is desirable to carry out both the receipt and delivery of the service water by an identical supply pipe, and to deal with service water transactions by means of a single flowmeter. To satisfy these requirements, bi-directional output-type flowmeters have heretofore been proposed.

SUMMARY OF THE INVENTION

In view of the foregoing, the main object of this invention is to provide a highly accurate, low-cost and small-sized signal converter for a bi-directional output-type electromagnetic flowmeter.

Briefly stated, this object is attained by a signal converter in accordance with the invention comprising a polarity detecting circuit arranged to detect the input polarity, inverting means to invert the input polarity and switching means to select the inverted or non-inverted signal in accordance with the output of the polarity detecting circuit. By the inverting action, an output of the same polarity as that produced in the normal flow direction can be obtained. Consequently, a highly accurate output signal for both normal flow direction and reverse flow direction can be obtained by the single signal converter.

OUTLINE OF THE DRAWING

For a better understanding of the invention, as well as other objects and further features thereof, reference is made to the following detailed description to be read in conjunction with the accompanying drawings, wherein:

FIG. 1 is a schematic diagram showing a conventional bi-directional output type electromagnetic flowmeter;

FIG. 4 is a schematic diagram showing a second preferred embodiment of a signal converter in accordance with the present invention;

FIG. 6 is a schematic diagram showing other examples of an essential component of this invention.

DESCRIPTION OF INVENTION

Prior Art

Figure 2:
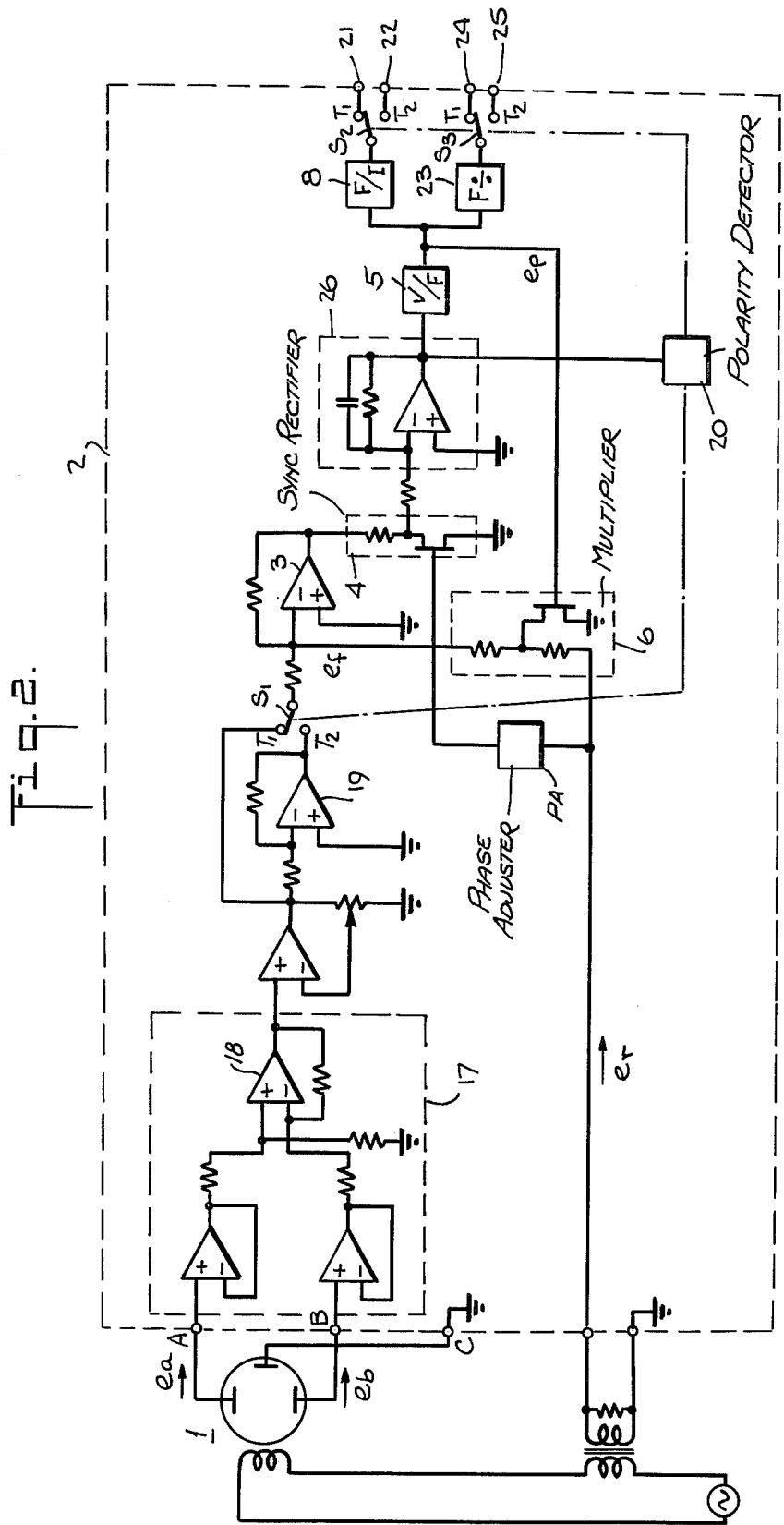
FIG. 2 is a schematic diagram showing a first preferred embodiment of a signal converter in accordance with the present invention.

FIG. 1 shows an example of a conventional signal converter provided in a bi-directional output type flowmeter. In this figure, an electromotive force $e_i$ generated by a flowmeter 1 is applied to a converter 2 enclosed in a dotted block. In converter 2, signal $e_i$ is compared with a negative feedback signal $e_f$ by a subtracting junction 3. The resultant difference signal after amplification is applied to a synchronous rectifier 4 whose rectified output is applied to a voltage-to-frequency converter 5, thereby generating a pulse signal $e_p$ whose duty cycle is proportional to the input voltage signal.

Signal $e_p$ is applied to a multiplying circuit 6, thereby multiplying the signal $e_p$ by a reference voltage $e_r$ which is proportional to the excitation current in the flowmeter so as to obtain the negative feedback signal $e_f$. As a result, the frequency of pulse signal $e_p$ is made proportional to the ratio of signal $e_i$ to reference voltage $e_r$. In this way, undesirable effects resulting from the fluctuations of the excitation current, which influences signal $e_i$ as a coefficient, can be completely eliminated, so that a pulse signal whose frequency is proportional only to the flow rate can be obtained. This pulse signal is applied to a frequency-to-current converter 7 whereby the pulse signal is converted to a current signal (i.e., 4 − 20 mA) corresponding to 0 to 100% volumetric flow rate.

With converter 2, in order to accomplish flow measurement for both flow directions, a zero point adjustment circuit is pre-adjusted in such manner that, when the flow rate is 0%, the frequency of the pulse signal $e_p$ becomes 5 KHz, and when the volumetric flow rate changes from −100% to +100%, the frequency thereof varies from 0 to 5 KHz to 10 KHz. Furthermore, frequency-to-current converter 7 is so adjusted that it generates a current output $I_1$ of 4 − 20 mA in accordance with the frequency signal from voltage-to-frequency converter 5.

Furthermore, the current output therefrom is converted so as to obtain a useful output. Namely, when the span of the current output $I_1$ derived from signal converter 2 is determined to be 4–20 mA, 4 mA which is the minimum current value, 12 mA which is the intermediate current value and 20 mA which is the maximum value correspond, respectively, to −100%, 0% and 100% of the flow rate.

For this purpose, in a subtracting circuit 8 shown by FIG. 1, a fixed current 12 mA is subtracted from the current output $I_1$, thereby producing a current output $I_2$, such that 0 to +100% of the flow rate and 0 to −100% of the flow rate correspond, respectively, to 0 to +8 mA of the current value and 0 to −8 mA of the current value.

Then, with a separator 9, the output $I_2$ obtained from subtracting circuit 8 is separated into an output $I_3$ in the normal flow direction, which varies from 0 to +8 mA in accordance with 0 to +100% of the volumetric flow rate, and an output in reverse flow direction, which varies from 0 to −8 mA in accordance with 0 to −100% of the volumetric flow rate. The output of 0 to −8 mA in the reverse flow direction is inverted by a polarity-inverting circuit 10, thereby producing an output $I_4$ varying from 0 to +8 mA. Both outputs $I_3$ and $I_4$ are applied to standard indicators 11 and 12 whereby flow rates of both flow directions are indicated respectively.

When an integrated value is required, outputs $I_3$ and $I_4$ are applied to current-to-frequency converters 13 and 14, wherein the current outputs $I_3$ and $I_4$ are converted to frequency signals, and the respective frequency signals thereof are indicated by integrators 15 and 16.

The above-described known type of signal converter has the following drawbacks:

1. Since the current output derived from signal converter 2 must be processed by use of several signal converters such as current subtracting circuit 8, separator 9, and current-to-frequency converters 13 and 14, the structure of the circuit is relatively complicated and manufacturing costs are high.

2. Since the current signal is transmitted through several signal converting circuits which lack negative feedback loops, accuracy of signal transmission is degraded to that degree. In particular, in integrators 15 and 16, these measurement errors become significant, for errors resulting from the signal-converting elements are integrated.

3. Since several signal converting circuits must be installed within the casing of signal converter 2, this requires a large size casing.

Another known method that has heretofore been proposed requires a pair of transmitters, i.e, magnetic flowmeters, of the same characteristic which are connected in series. These transmitters are automatically selected in accordance with the polarity of the electromotive force signal which varies in accordance with the flow direction. However, this method is expensive and has the same drawbacks as the other known method.

First Embodiment

Referring now to FIG. 2, like reference numerals in FIG. 1 are used to designate like components. Electromotive force signals $e_a$ and $e_b$ induced across a pair of electrodes in an electromagnetic flowmeter 1 are applied to input terminals A and B of signal converter 2. Input signal $e_i$ in FIG. 1 corresponds to $e_i = e_a - e_b$. Terminal C represents a common voltage terminal. Input signals $e_a$ and $e_b$ are introduced differentially to a high input impedance amplifier 17. The output voltage signal therefrom, being proportional to $(e_a - e_b)$, is fed to an amplifier 18 wherein the voltage signal is amplified to a predetermined extent.

In this invention, the output signal of amplifier 18 and a signal whose polarity is inverted by an inverting amplifier 19 are selected by a switch $S_1$ which is controlled by the output of a polarity-detecting circuit 20. The signal selected by switch $S_1$ is applied, through subtracting circuit 3, to synchronous rectifying circuit 4. A switch $S_2$ arranged at the output side of frequency-to-current converter 8, and a switch $S_3$ arranged at the output side of a frequency-divider 23 are both controlled by polarity-detecting circuit 20, together with switch $S_1$.

When the flow direction is normal, a current output of normal polarity and a pulse form output can be obtained at output terminals 21 and 24, respectively. Furthermore, when the flow direction thereof reverses, the current output of the same polarity as that in the above-described normal flow direction, and a pulse output can be obtained at output terminals 22 and 25, respectively.

Figure 3:
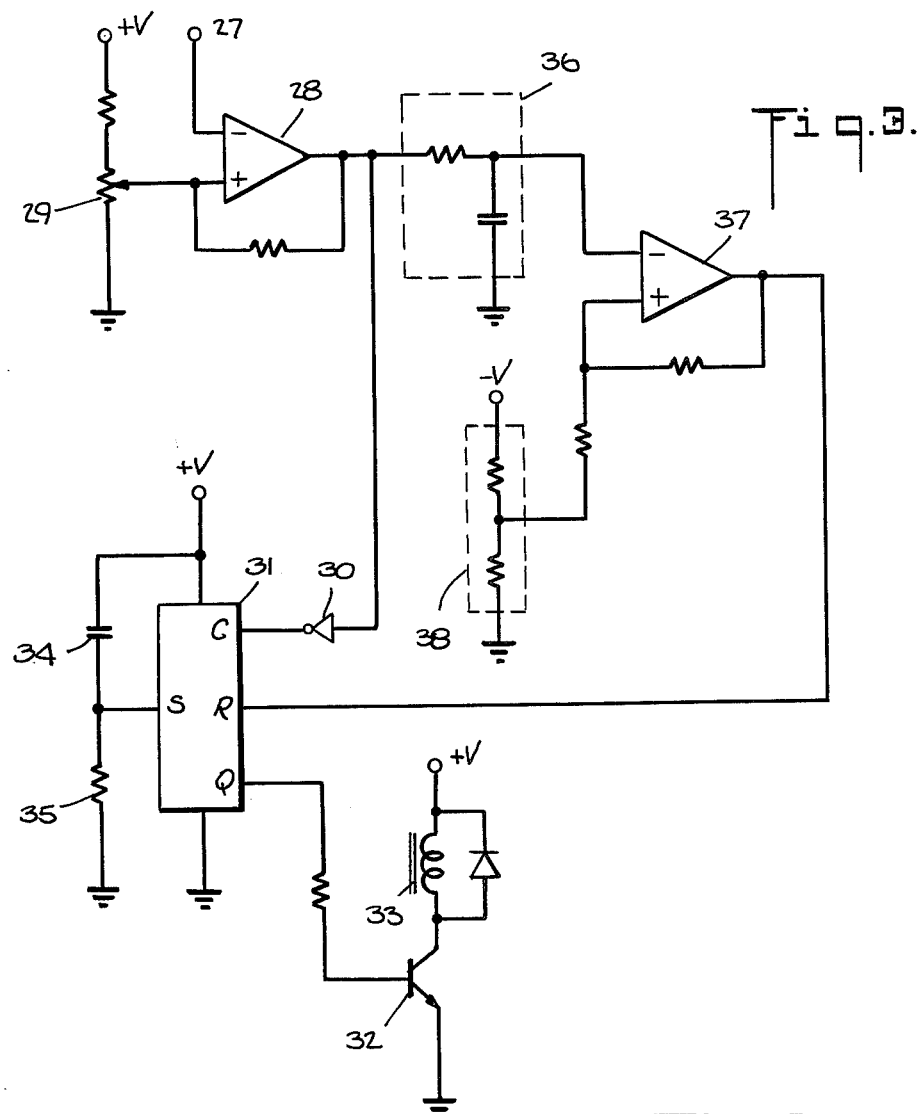
FIG. 3 is a schematic diagram showing one example of an essential component of the present invention.

While the polarity-detecting circuit 20 will be fully explained in conjunction with FIG. 3, we will now point out that a polarity DC voltage is derived from a filter circuit 26, thereby smoothing the output of synchronous rectifier 4. The output of filter 26 is applied to voltage-to-frequency converter 5 and is detected by polarity-detecting circuit 20.

Assuming that with a normal flow direction the DC voltage is of negative polarity, switches $S_1$, $S_2$ and $S_3$ are then caused to engage fixed contacts $T_1$. As a result, the output of amplifier 18 is applied through subtracting circuit 3 to synchronous rectifier 4, and outputs can be obtained from current output terminal 21 and pulse form output terminal 24.

On the other hand, when the flow direction reverses and when the polarity of the DC voltage derived from smoothing circuit 26 is inverted, switches $S_1$, $S_2$ and $S_3$ are then caused to engage contacts $T_2$ by the output of polarity-detecting circuit 20. As the result, the signal whose polarity is inverted by inverting amplifier 19 is applied to synchronous rectifier 4 whose rectified output reverts to the normal output of positive polarity.

The normal output from rectifier 4 is further inverted by smoothing circuit 26 and applied to voltage-to-frequency converter 5. Therefore, even though the flow direction reverses, voltage-to-frequency converter 5 acts normally and supplies an output pulse signal to multiplying circuit 6.

Accordingly, multiplying circuit 6 can act normally, thereby producing feedback signal $e_f$. Through switches $S_1$, $S_2$ and $S_3$ which are reversed, the current output and pulse form output which are proportional to the flow rate in the reverse flow direction can be obtained at a current output terminal 22 and a pulse output terminal 25 in the reverse flow direction.

As explained before, in accordance with the present invention, highly accurate and bi-directional outputs can be obtained selectively at output terminals 21 and 24, or 22 and 25 of the signal converter. Furthermore, block PA in FIG. 2 represents a phase-adjusting circuit whereby the phase of a standard phase signal which is applied to synchronous rectifier 4 is adjusted properly.

Polarity Detecting Circuit

Referring now to FIG. 3, there is shown one example of the polarity-detecting circuit 20. In this figure, to an input terminal 27, there is applied the DC output voltage from smoothing circuit 26. This DC input signal is applied to an inverting input terminal of a differential amplifier 28, whereby the DC input signal is compared with a reference (neutral) voltage applied to a non-inverting input terminal thereof from a potentiometer 29 which constitutes a level setting circuit.

When the resultant signal obtained by comparison with a neutral voltage (i.e., 0 volt) is in positive polarity form, amplifier 28 generates a negative voltage signal. When the resultant signal is in negative polarity form, the output of amplifier 28 is inverted, so that this amplifier generates the output of positive polarity.

The output voltage of amplifier 28 is applied through an inverter 30 to the trigger terminal C of a flip-flop circuit 31 which is triggered when the output of inverter 30 turns from low or "0" to high or "1." The base of transistor 32 is connected to the output terminal Q of flip-flop circuit 31. A relay 33 is connected between the collector of transistor 32 and an electric power source +V, thereby actuating switches $S_1$, $S_2$ and $S_3$. To the set terminal S of flip-flop circuit 31, an initial setting circuit composed of a capacitor 34 and a resistor 35 is connected. This circuit acts to supply a high or "1" signal to set terminal S of flip-flop circuit 31 at the instant when electric power is applied thereto, thereby setting flip-flop circuit 31 to an initial condition.

Accordingly, the output of terminal Q of flip-flop circuit 31 maintains a high or "1," and transistor 32 maintains an "on" state. Thus, relay 33 is excited, thereby actuating switches $S_1$, $S_2$ and $S_3$ to engage fixed contacts $T_1$.

In this case, if the flow direction is normal, inverter 30 maintains a low or "0" output since the polarity of the output voltage of smoothing filter 26 is negative and since the output of amplifier 28 is a positive voltage.

When the flow direction reverses, the output voltage of smoothing filter 26 assumes a positive polarity and the output of amplifier 28 is inverted to a negative voltage. As a result, the output of inverter 30 changes from low or "0" to high or "1," thereby triggering flip-flop 31. Thus, the output terminal Q of the flip-flop turns to low or "0," and the excitation for relay 33 is terminated, thereby actuating switches $S_1$, $S_2$ and $S_3$ to engage contacts $T_2$.

By this switching action, the output voltage of smoothing filter 26 is changed to a negative polarity and the signal of the same polarity as that in the normal flow direction is applied to voltage-to-frequency converter 5. Incidentally, in this case, even though the output of smoothing filter 26 is changed from positive to negative and even though the output of amplifier 28 is inverted from positive to negative, as a result of which inverter 30 is changed from high level or "1" to low level or "0," flip-flop 31 is not inverted.

When the flow direction returns to its normal direction, the output voltage of smoothing filter 26 is also changed from negative to positive polarity. As the result, the output voltage of amplifier 28 is inverted in the same manner as in the aforementioned case, and thus the output of inverter 30 is inverted from low or "0" to high or "1," so that flip-flop 31 is triggered. The output terminal Q of the flip-flop is inverted into high or "1," thereby exciting relay 33. As the result, switches $S_1$, $S_2$ and $S_3$ are shifted to their normal position; that is, to engage contacts $T_1$, and the output voltage of smoothing filter 26 returns to negative polarity. Hence a normal, negative polarity voltage is applied to voltage-to-frequency converter 5. At the same time, the output of amplifier 28 returns to positive, thereby resetting the output of inverter 30 into low or "0" state.

Ultimately, flip-flop circuit 31 is triggered for every inversion of the flow direction, and switches $S_1$, $S_2$ and $S_3$ are inverted. And after these switches are inverted, the output voltage of smoothing filter 26 is always caused to assume its normal polarity condition (i.e., negative polarity), and the output of amplifier 28 is rendered positive, whereby the output of inverter 30 is stabilized at low or "0" state.

Incidentally, in the initial condition in which flip-flop circuit 31 is set and switches $S_1$, $S_2$ and $S_3$ are caused to engage contacts $T_1$, when the flow direction is reversed with respect to the normal flow direction, the output of amplifier 28 becomes negative and the output of inverter 30 takes high or "1," since the output of smoothing filter 26 is of positive polarity. As a result, if the converter is initially set in this manner, one runs the risk that flip-flop circuit 31 will not be triggered even when the flow direction reverses, and that switches $S_1$, $S_2$ and $S_3$ will not act normally.

To overcome this drawback, a time-constant circuit 36, a differential amplifier 37 and a voltage setting circuit 38 are arranged on the output side of amplifier 28. The output of amplifier 28 is applied through time-constant circuit 36 to the inverting input terminal of differential amplifier 37, a fixed voltage of negative polarity being applied to non-inverting input terminal thereof. In this arrangement, when switches $S_1$, $S_2$ and $S_3$ select the contacts $T_1$ in reverse direction flow and when the output voltage of amplifier 28 is stabilized at the negative voltage, the voltage level at the inverting input terminal of amplifier 37 decreases gradually in the negative voltage direction in accordance with the time-constant of circuit 36. When some fixed time has elapsed, the voltage at the inverting input terminal of amplifier 37 becomes equal to the voltage at the non-inverting input terminal thereof. When the voltage at the inverting input terminal thereof decreases further below this balance point, the output of differential amplifier 37 is inverted into a positive voltage. The output therefrom is applied to the reset terminal R of flip-flop circuit 31, so that flip-flop circuit 31 is reset.

As a result, output terminal Q of flip-flop circuit 31 turns to low or "0," and transistor 33 is rendered "off," thereby terminating excitation of relay 33. Thus, switches $S_1$, $S_2$ and $S_3$ are shifted to engage contacts $T_2$ which is the normal switching position.

Accordingly, by means of polarity-detecting circuit 20, even though the liquid to be measured flows in either direction, the precise flow direction can be detected when the power source is initially applied, and switches $S_1$, $S_2$ and $S_3$ are always caused to assume their normal switching position, so that a precise flow rate signal may be transmitted.

Second Preferred Embodiment

Referring now to FIG. 4, there is shown the second preferred embodiment in accordance with this invention. The signal converter in this embodiment is so constructed that the polarity of the flow signal $e_i$ is directly compared with a standard phase signal.

In this embodiment, one of the outputs from amplifier 18 and inverting amplifier 19 is selected by switch $S_1$, and the selected signal is applied through subtracting circuit 3 to synchronous rectifier 4. The arrangement by which switches $S_2$ and $S_3$ act together with switch $S_1$ is the same as that in the embodiment shown in FIG. 2.

Figure 5:
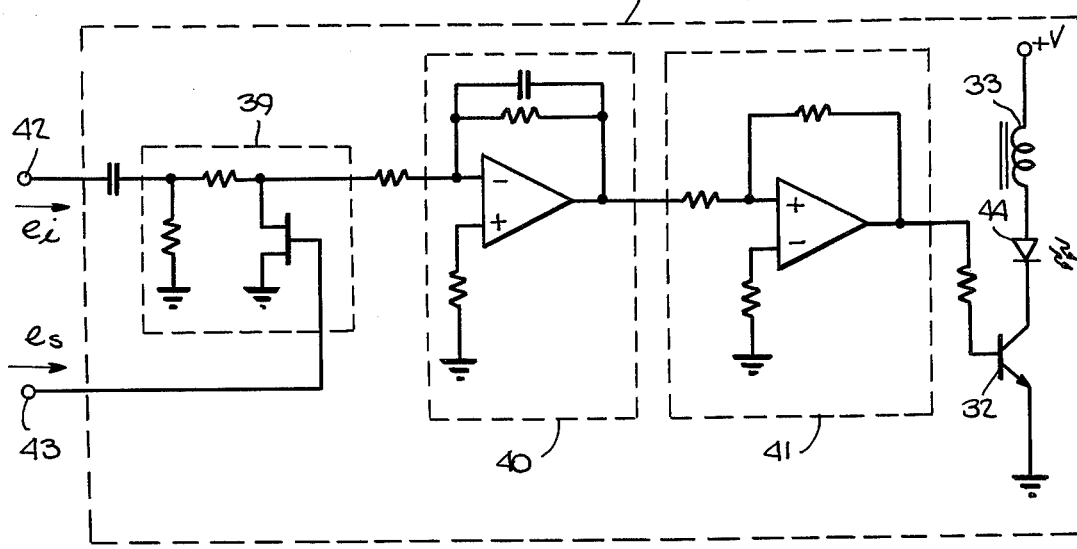
FIG. 5 is a schematic diagram showing one example of the polarity detecting circuit included in the invention.

The feature of this embodiment is that the output of amplifier 18 is applied to polarity-detecting circuit 20 whereby the phase of the output of amplifier 18 is compared with a standard phase signal so as to detect the polarity thereof. For this standard phase signal $e_s$, the signal derived from phase adjusting circuit PA may be used. Polarity-detecting circuit 20 may be composed, as shown in FIG. 5, of a synchronous rectifier 39, a smoothing circuit 40, a voltage comparator 41, a transistor 32 to energize a light emission diode 44 and a relay 33.

With this arrangement applied to input terminals 42 and 43 of synchronous rectifier 39 are the flow signal $e_i$ and the standard phase signal $e_s$ derived from phase adjusting circuit PA, respectively, whereby flow signal $e_i$ is synchronously rectified by the use of standard phase signal $e_s$. The rectified output therefrom is applied, through smoothing circuit 40 to voltage comparator 41 whereby the smoothed output therefrom is compared with a fixed reference voltage.

Assuming that the rectified output from synchronous rectifier 39 assumes a negative polarity—for example, when the liquid to be measured flows in the normal direction—and assuming that the rectified output thereof assumes a positive polarity in the reverse flow direction, the output of voltage comparator 41 becomes positive in the normal flow direction, and becomes negative in the reverse flow direction.

Accordingly, when the output of comparator 41 in the normal flow direction is applied to the base of transistor 32, transistor 32 assumes its "on" state, and relay 33 connected in series to the collector of transistor 33 is energized, thereby actuating switches $S_1$, $S_2$ and $S_3$ to engage contacts $T_1$.

As a result, the output of amplifier 18 applied directly to subtracting circuit 3 and then to synchronous rectifier 4. At output terminals 21 and 24, the outputs of the normal flow direction can be obtained through switches $S_2$ and $S_3$.

When the flow direction reverses, the output of voltage comparator 41 becomes a negative voltage, and transistor 32 is rendered "off," thereby terminating excitation for relay 33. As a result, switches $S_1$, $S_2$ and $S_3$ are drifted over to contacts $T_2$. When switch $S_1$ engages contact $T_2$, the inverted signal whose polarity is inverted by inverting amplifier 19 is applied, through switches $S_2$ and $S_3$, to output terminals 22 and 25 for the reverse flow direction.

Incidentally, when a photo-emitting element such as a light emission diode 44 is connected in series with relay 33, the flow direction may be detected by the lighting indication thereof.

As explained previously, in the embodiment shown in FIG. 5, the polarity detecting circuit 20 does not require a memory such as a flip-flop circuit; hence the construction thereof may be simplified.

Even though, as previously explained, a relay is used for switch $S_1$, it may be replaced by a transistor switch $S_1$ such as field effect transistors $Q_1$ and $Q_2$, as shown in FIG. 6. In this case, relay 33 is used only for switching output circuits. Block 45 in this figure represents a polarity-inverting circuit to invert the polarity of the output voltage derived from voltage comparator 41. By this circuit, field effect transistor $Q_1$ or $Q_2$ is driven selectively.

Since in other respects the construction and operation of this embodiment is essentially the same as in the earlier embodiment, a detailed explanation is unnecessary.

As explained before, the bi-directional output type signal converter in accordance with the present invention may be constituted by relatively few elements such as inverting amplifier 19, switches $S_1$, $S_2$ and $S_3$, polarity-detecting circuit 20, and means to actuate these switches, i.e., transistor 32 and relay 33. Thus the arrangement is simple and economical.

Furthermore, since the output in the reverse flow direction is obtained by inverting the polarity of the flow signal $e_i$ to be applied to the closed loop in the signal converter, one thereby omits other converters which are necessary in the conventional apparatus and yet obtains a highly accurate output signal.

Moreover, since when the flow direction reverses an output of the same polarity as that of the output in the normal flow direction is obtained, integration of the output, if required, can be effected by introducing the output directly to an integrator without the need of any signal converters, thereby further reducing the cost of the system.

Although, in the embodiments disclosed herein, the signal converter of this invention is applied to an electromagnetic flowmeter, this invention may be applied to various other measuring devices such as industrial instruments to measure temperature, pressure and so on.

While there have been shown and described preferred embodiments in accordance with the invention, it will be appreciated that many changes and modifications may be made therein without, however, departing from the essential spirit thereof.

I claim:

1. A converter circuit for an electromagnetic flowmeter in which a fluid is flowable in a normal direction or in the reverse direction and having a bi-directional output, said flowmeter having a pair of electrodes yielding an input signal that depends on flow rate, said circuit comprising:
   (A) a polarity-detecting means responsive to the direction of flow to detect the polarity of said input signal;
   (B) inverting means to invert the polarity of said input signal; and
   (C) switching means to select the inverted or non-inverted input signal in accordance with the output from said polarity-detecting means.

2. A converter circuit as set forth in claim 1, wherein said polarity-detecting means includes a differential amplifier having an inverting input terminal and a non-inverting input terminal, said input signal being applied to said inverting input terminal, and means to apply a neutral reference voltage to the non-inverting input terminal whereby the amplifier acts to compare the input signal with the reference voltage to produce an output signal whose polarity is inverted with respect to that of the input signal.

3. A converter as set forth in claim 1, wherein said polarity detecting means includes a phase detector and a standard phase signal source, said detector comparing said input signal with said standard phase signal to produce an output signal which is of positive polarity in one flow direction and is of negative polarity in the opposite direction.

* * * * *